(12) United States Patent
Hakura et al.

(10) Patent No.: US 9,214,008 B2
(45) Date of Patent: Dec. 15, 2015

(54) SHADER PROGRAM ATTRIBUTE STORAGE

(71) Applicant: NVIDIA Corporation, Santa Clara, CA (US)

(72) Inventors: Ziyad Sami Hakura, Gilroy, CA (US); Emmett M. Kilgariff, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 346 days.

(21) Appl. No.: 13/745,707

(22) Filed: Jan. 18, 2013

(65) Prior Publication Data

US 2014/0204106 A1    Jul. 24, 2014

(51) Int. Cl.
*G06F 12/02* (2006.01)
*G06T 1/60* (2006.01)

(52) U.S. Cl.
CPC ............... *G06T 1/60* (2013.01); *G06F 12/023* (2013.01)

(58) Field of Classification Search
None
See application file for complete search history.

(56) References Cited

U.S. PATENT DOCUMENTS

| | | | |
|---|---|---|---|
| 8,407,443 B1* | 3/2013 | Nordquist | 711/170 |
| 8,504,773 B1* | 8/2013 | Glasco et al. | 711/118 |
| 2008/0049031 A1* | 2/2008 | Liao et al. | 345/530 |
| 2008/0235316 A1* | 9/2008 | Du et al. | 708/513 |
| 2009/0033672 A1* | 2/2009 | Jiao et al. | 345/559 |
| 2009/0189909 A1* | 7/2009 | Jiao et al. | 345/506 |
| 2012/0223947 A1* | 9/2012 | Nystad et al. | 345/426 |

* cited by examiner

*Primary Examiner* — Jacinta M Crawford
(74) *Attorney, Agent, or Firm* — Zilka-Kotab, PC

(57) ABSTRACT

A system, method, and computer program product are provided for determining a size of an attribute storage buffer. Input attributes read by a shader program to generate output attributes are identified. A portion of the output attributes to be consumed by a destination shader program is identified. The size of the attribute storage buffer that is allocated for execution of the shader program is computed based on the input attributes and the portion of the output attributes.

20 Claims, 7 Drawing Sheets

SHADER PROGRAM ATTRIBUTE STORAGE

FIELD OF THE INVENTION

The present invention relates to computing, and more particularly to the storage of data,

BACKGROUND

During execution of a shader program input attributes are read from memory, processed, and output attributes are stored to the memory. Because a shader program is not necessarily constrained to read all of the input attributes from the memory before any of the output attributes are written to the memory. Therefore, separate portions of the memory need to be allocated for storing the input attributes and the output attributes. In some cases, processing performance is limited because more memory is needed for allocation to additional shader programs or to increase the parallel execution of a shader program.

Thus, there is a need for addressing the issue of attribute storage and/or other issues associated with the prior art.

SUMMARY

A system, method, and computer program product are provided for determining a size of an attribute storage buffer. Input attributes read by a shader program to generate output attributes are identified. A portion of the output attributes to be consumed by a destination shader program is identified. The size of the attribute storage buffer that is allocated for execution of the shader program is computed based on the input attributes and the portion of the output attributes.

DETAILED DESCRIPTION

Conventional graphics processors that include multiple processing units are configured to execute shader programs. As previously explained, separate storage is allocated for input attributes and output attributes of a shader program. When the shader program executes on one or more processing units, the processing units can read input attributes from one attribute buffer and write output attributes to another attribute buffer in an arbitrary order. Attribute buffers are used to temporarily store attributes generated by a shader program and/or consumed by a destination shader program to transfer data between different shader programs and/or fixed-function hardware engines in a pipeline. In one embodiment, for multi-threaded execution, attribute buffers are allocated for a group of threads that are executed in parallel on a processing unit, so that the amount of storage that is allocated is the per-thread attribute storage multiplied by the number of threads in the group. When the amount of storage available for attribute buffers is limited, the number of threads that can execute the shader program is limited, possibly limiting performance A compiler may be configured to examine the shader program, and, if all of the attribute read operations occur before any of the attribute write operations, the compiler may set a flag indicating that optimization of the attribute storage is possible. In one embodiment, the compiler may be configured, when possible, to reorder the attribute read and write operations within the shader program, so that all of the attribute read operations occur before any of the attribute write operations. When a processing unit is configured to execute the shader program and the flag is set, indicating that optimization of the attribute storage is possible, a single attribute storage buffer may be allocated for storing the input attributes and the output attributes. The size of the attribute buffer that is allocated is the maximum of the amount of storage needed for the input attributes and the output attributes. In contrast, when a separate input attribute buffer and output attribute buffer is allocated, the amount of storage is the sum of the storage needed for the input attributes and the output attributes. Thus, when the amount of storage needed for the input attributes equals the amount of storage needed for the output attributes, and the attribute storage optimization flag is set, the attribute storage buffer size that is allocated to the processing unit for the shader program may be halved.

Figure 1:
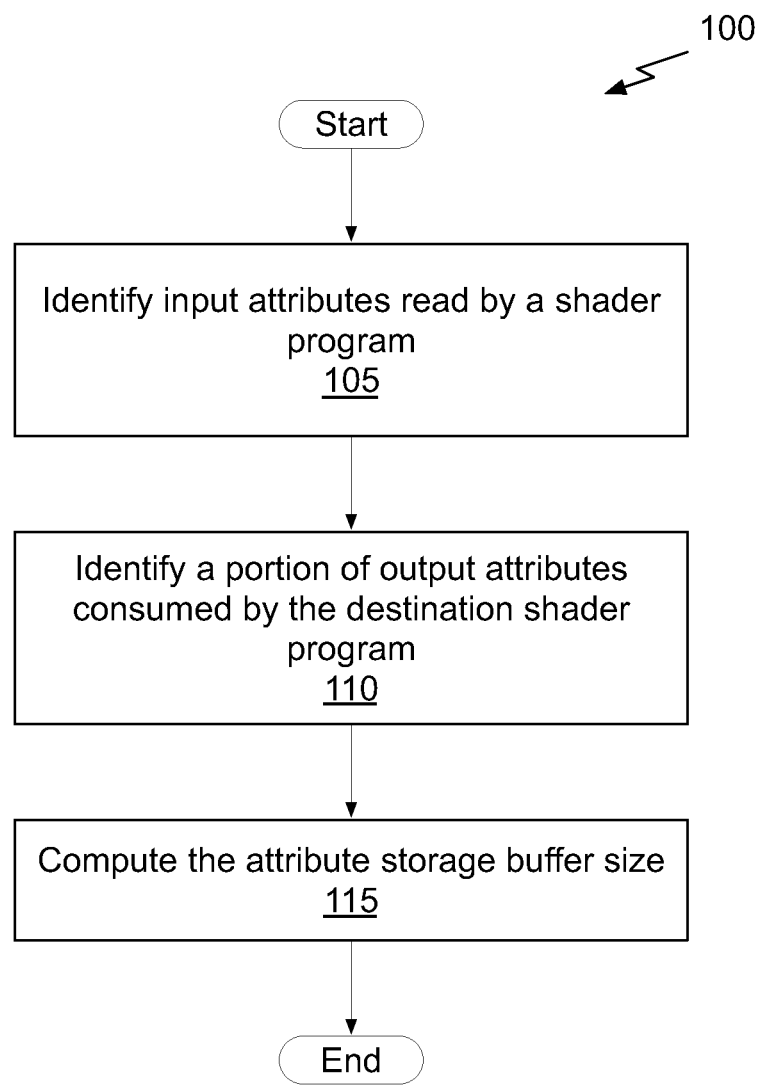
FIG. 1 illustrates a flowchart of a method for computing a size of an attribute storage buffer, in accordance with one embodiment.

FIG. 1 illustrates a flowchart of a method 100 for computing a size of an attribute storage buffer, in accordance with one embodiment. At step 105, input attributes read by a shader program to generate output attributes are identified. A portion of the output attributes including one or more of the output attributes generated by the shader program are input attributes that are consumed by a destination shader program. At step 110, the portion of output attributes consumed by the destination shader program are identified. At step 115, the size of the attribute storage buffer that is allocated for execution of the shader program is computed based on the input attributes and the portion of the output attributes.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
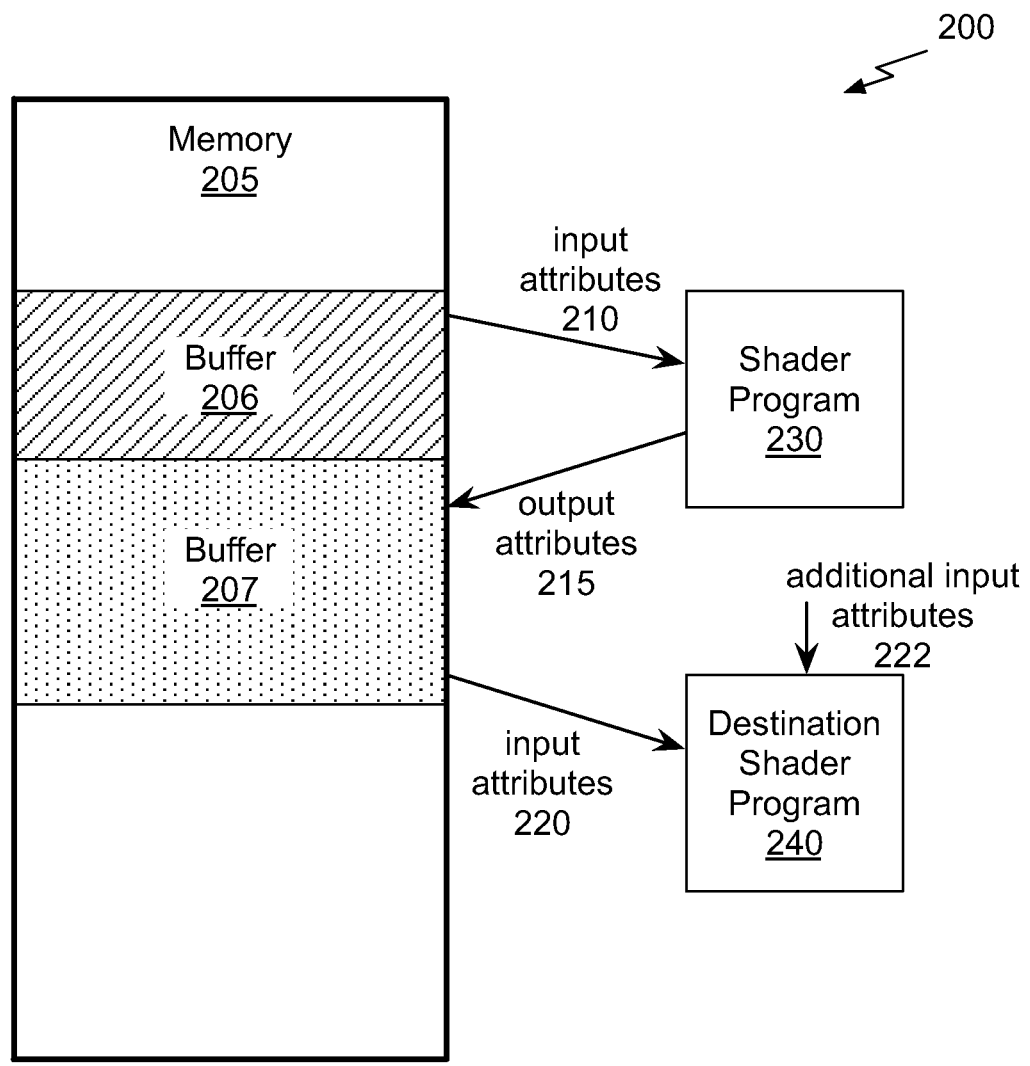
FIG. 2 illustrates a conceptual diagram of attribute storage buffers corresponding to shader programs, in accordance with one embodiment.

FIG. 2 illustrates a conceptual diagram 200 of a memory 205 storing attribute storage buffers 206 and 207 that correspond to shader programs 230 and 240, in accordance with one embodiment. The attribute buffer 206 stores the input attributes 210 that are read by the shader program 230. The attribute buffer 207 stores the output attributes 215 that are generated by the shader program 230. The portion of the output attributes 215 that are consumed by the destination shader program 240 are the input attributes 220.

When the amount of storage needed to store the input attributes 220 is less than the amount of storage needed to store the output attributes 215, the size of the attribute buffer 207 may reduced to the intersection of the portion of the output attributes 215 that are consumed by the destination shader program 240, i.e., the input attributes 220. The output attributes 215 that are not consumed by the destination shader program 240 may be discarded. In addition to the input attributes 220, the destination shader program 240 may also consume "default" input attributes that are not included in the output attributes 215. The default input attributes are additional input attributes 222 that are set to default values and are not stored in the buffer 207. The additional input attributes 222 are not read from an attribute buffer, however, like the input attributes 220, the additional input attributes 222 are also consumed by the destination shader program 240.

As shown in FIG. 2, the amount of storage allocated in the memory 205 for execution of the shader program 230 is the sum of the storage needed for the input attributes and the output attributes, i.e., the sum of the sizes of the attribute buffer 206 and the attribute buffer 207. Thus, when the attribute storage optimization flag is set, the attribute storage buffer size that is allocated for execution of the shader program may be reduced to the maximum size of the attribute buffer 206 and the attribute buffer 207, i.e., the size of the attribute buffer 207.

The shader program 230 and/or 240 that is executed by one or more processing units may be a vertex shader, tessellation shader, geometry shader, pixel shader, hull shader, domain shader, compute shader, or other type of shader program. The attributes stored in the memory 205 are vertex, geometry, pixel, or other types of attributes that are consumed and/or generated by a shader program. In one embodiment, the shader program 230 and/or the destination shader program 240 is replaced with a fixed function hardware engine comprising circuitry that is configured to receive input attributes and generate output attributes.

Figure 3:
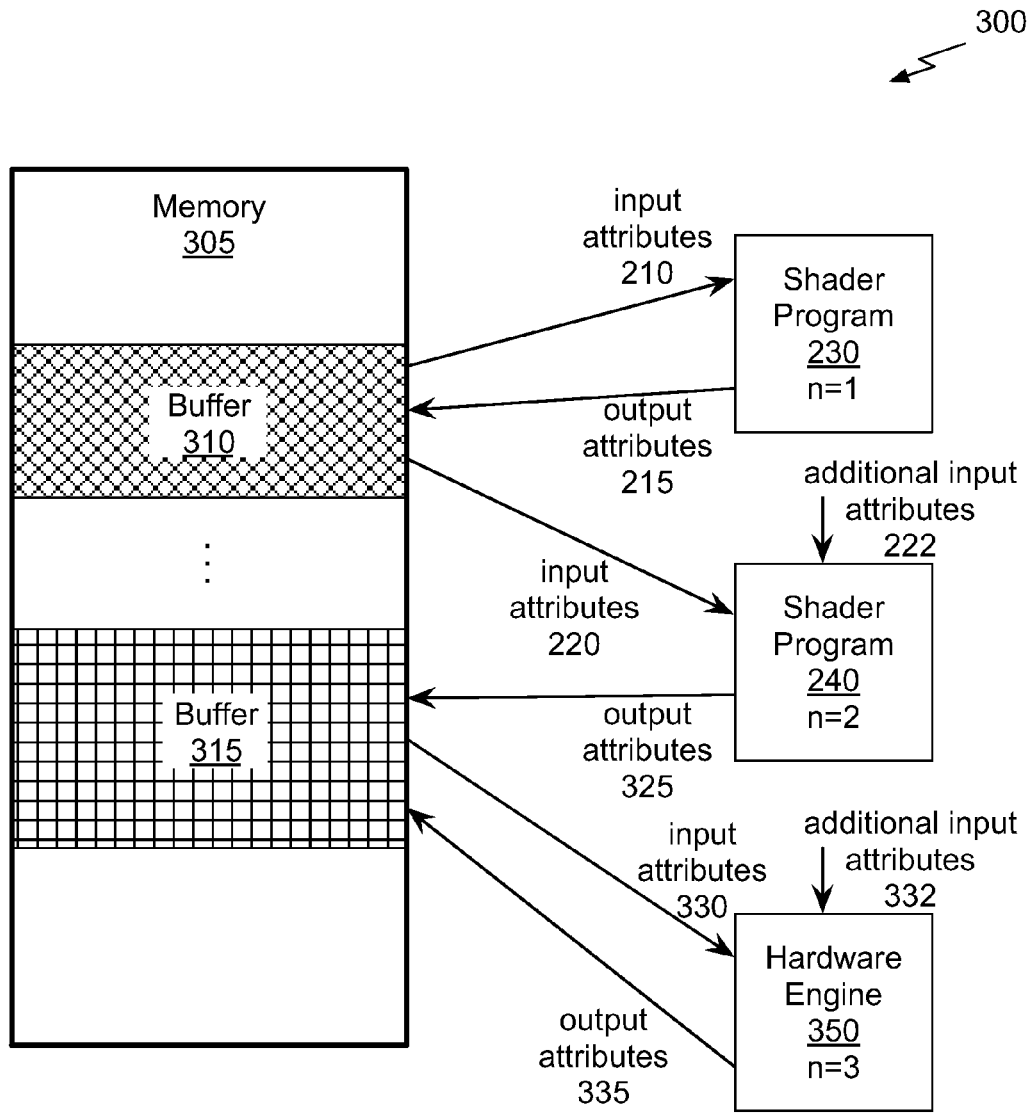
FIG. 3 illustrates another conceptual diagram of attribute storage buffers corresponding to shader programs, in accordance with one embodiment.

FIG. 3 illustrates a conceptual diagram 300 of a memory 305 storing attribute storage buffers 310 and 315 that correspond to shader programs 230 and 240, and fixed-function hardware engine 350, in accordance with one embodiment. The attribute buffer 310 stores the input attributes 210 that are read by the shader program 230 and the output attributes 215 that are generated by the shader program 230 and, at least a portion of which, are also consumed by the shader program 240 as input attributes 220. The shader programs 230 and 240 and the fixed-function hardware engine 350 are configured in a processing pipeline of n stages where shader program 230 is a first stage, n=1, shader program 240 is a second stage, n=2, and the fixed-function hardware engine 350 is a third stage, n=3. In one embodiment, the output attributes 335 generated by the fixed-function hardware engine 350 may be pixel data that is written to a frame buffer instead of the attribute buffer 315 or that is written to another attribute buffer. The hardware engine 350 may be configured to receive additional input attributes 332 that are set to default values and are not stored in the buffer 315. The additional input attributes 332 are not read from an attribute buffer, however, like the input attributes 330, the additional input attributes 332 are also consumed by the fixed-function hardware engine 350.

In contrast with the example shown in FIG. 2, the attribute storage optimization flag is set for the shader program 230. Therefore, the attribute storage buffer size that is allocated for execution of the shader program 230 may be reduced to the maximum size of the attribute buffer 206 and the attribute buffer 207, i.e., the size of the attribute buffer 207. However, the storage that is needed for the input attributes 220 that are consumed by the shader program 240 is less than the storage that is needed for the output attributes 215. Therefore, the size of the attribute buffer 310 is computed based on the maximum of the amount of storage for the input attributes 210 and the amount of storage for the input attributes 220. It is not necessary to allocate storage for one or more attributes of the output. attributes 215 that are not consumed by the shader program 240. It is also not necessary to allocate storage for the additional input attributes 222 that are not generated by the shader program 230, but that are consumed by the shader program 240. In one embodiment, the shader program 230 may be configured to discard writes of output attributes 215 that are not consumed by the shader program 240 and the shader program 240 may be configured to set the additional input attributes 222 to default values.

In one embodiment, each shader program 230 and 240, and fixed-function hardware engine 350 specifies an IMAP and an OMAP. The IMAP associated with a particular shader program or fixed-function hardware engine indicates which input attributes of a set of possible input attributes are consumed by the particular shader program or fixed-function hardware engine. The IMAP indicates the input attributes that are consumed, i.e. the additional input attributes that are set to default values as well as the input attributes that are read from an attribute buffer. The OMAP associated with a particular shader program or fixed-function hardware engine indicates which output attributes of a set of possible output attributes are generated by the particular shader program or fixed-function hardware engine. The IMAP and the OMAP may be encoded as a mask including one bit for each of the possible attributes.

A base address is associated with each attribute buffer 310 and 315, and the IMAP specified by the corresponding shader program, and in some cases, the IMAP can be used in combination with the base address to determine the location within the input attribute buffer where the attribute can be found. However, because all of the input attributes that are consumed by a shader program or fixed-function hardware engine are not stored in the attribute buffer 310 and 315, i.e., the additional input attributes are not stored, the IMAP may not be reliable for determining where a particular input attribute is read from the attribute buffer 310 or 315. Similarly, because all of the output attributes are not necessarily stored in the attribute buffer 310, the OMAP may not be reliable for determining where a particular output attribute should be written within the attribute buffer 310 or 315.

The OMAP specified by the shader program 230 may be combined with the IMAP specified by the destination shader program 240 and then combined with the base address associated with the attribute buffer 310 to determine the location where each output attribute that will be read by the shader program 240 is written by the shader program 230. For example, when the OMAP and IMAP are represented as masks, a combined mask, BMAP may be computed as an intersection of the previous OMAP and current IMAP. More specifically, $BMAP_n = OMAP_n \ \& \ IMAP_{n+1}$, where n indicates the order of the shader programs 230 and 240 and the fixed-function hardware engine 350. The $BMAP_0$ may be set equal to $IMAP_1$. The $BMAP_{n-1}$ is used to determine the location where each input attribute may be read from an attribute buffer and the $BMAP_n$ is used to determine the location where each output attribute that is generated may be written to an attribute buffer. The size of the attribute buffer 310 may be computed based on the $BMAP_{n-1}$ and $BMAP_n$ corresponding to the shader program 230. The additional input attributes that are not read from an attribute buffer, but that are consumed by are identified as $\sim OMAP_{n-1} \ \& \ IMAP_n$.

In one embodiment, the attribute storage optimization flag is not set for the shader program 240. The attribute storage optimization flag may be stored in the shader header of the shader program 240. Therefore, the output attributes 325 that are generated by the shader program 240 cannot be stored in the attribute buffer 310 and, instead, are stored in a separate attribute buffer 315. The fixed-function hardware engine 350 is configured to read all of the input attributes 330 before writing any of the output attributes 335, so the output attributes 335 that are generated by the fixed-function hardware engine 350 can be stored in the same attribute buffer that stores the input attributes 330 that are read by the fixed-function hardware engine 350, i.e., the attribute buffer 315. The size of the attribute buffer 315 may be computed based on the maximum of the amount of storage for the input attributes 330, the amount of storage for the output attributes 325, and the output attributes 335. The amount of storage needed for the output attributes 335 may be reduced based on an IMAP if an destination shader or fixed-function hardware engine is added. As shown in FIG. 3, when the attribute storage optimization flag is set, the attribute storage buffer size that is allocated for execution of a particular shader program or fixed-function hardware engine may be computed based on the $BMAP_{n-1}$ and $BMAP_n$ corresponding to the shader program or fixed-function hardware engine.

The attribute storage optimization improves performance of the shader programs, by allowing more threads to execute simultaneously in a processing unit. The processing capacity may be more effectively utilized when the number of threads that can execute simultaneously is not limited by the memory available for allocation to attribute buffers. In some embodiment, the memory 205 and/or 305 is a shared memory that may be allocated for the storage of input and output attributes as well as other data. The attribute storage optimization may be particularly useful at lower screen resolutions where a system is more likely to be limited by vertex shader performance assuming pixel count decreases to a greater extent compared with geometric complexity. In other words, when the number of pixels that are displayed decreases, the number of vertices does not necessarily decrease.

Figure 4:
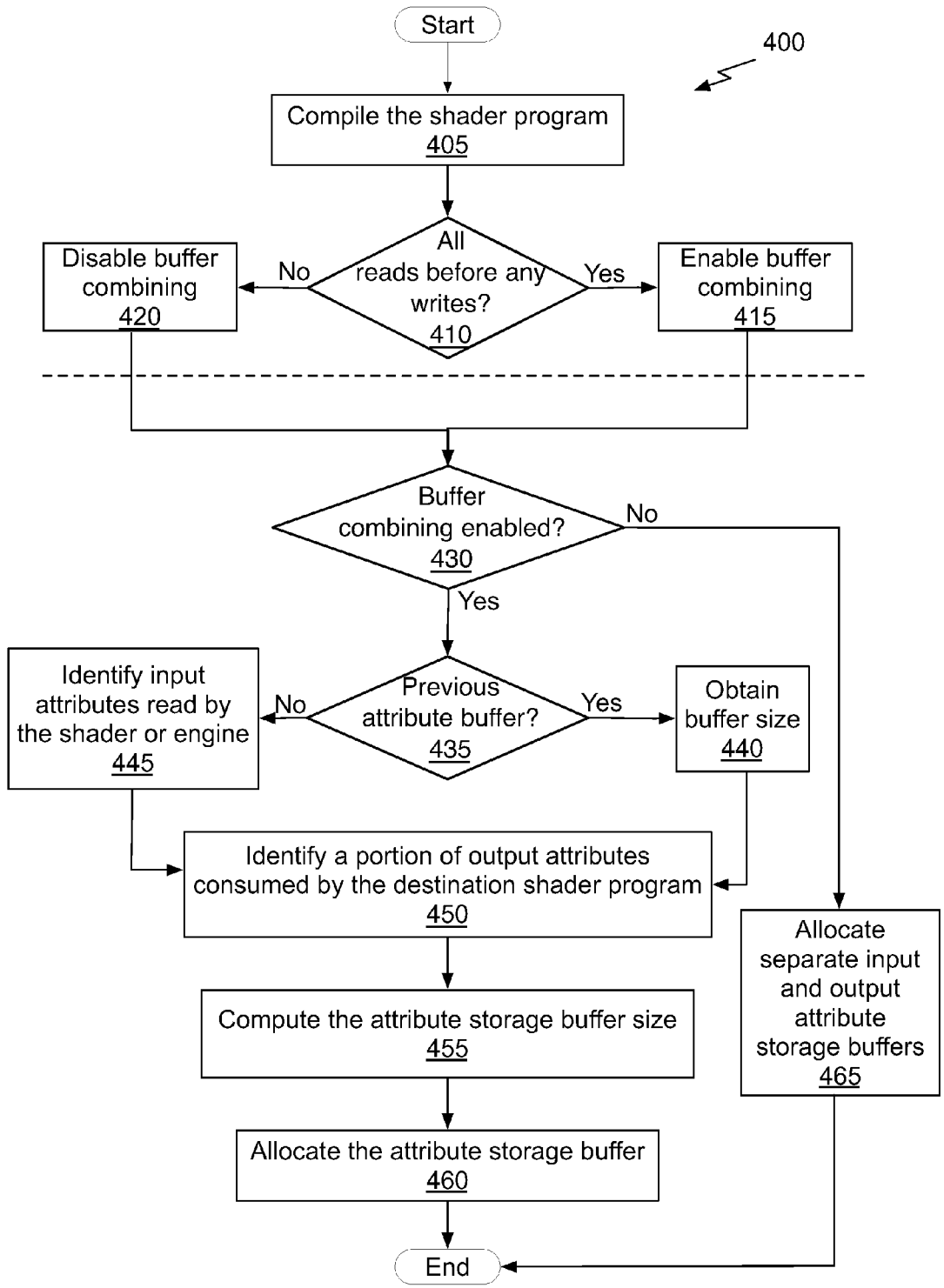
FIG. 4 illustrates another flowchart of a method for computing a size of an attribute storage buffer, in accordance with one embodiment.

FIG. 4 illustrates another flowchart of a method 400 for computing a size of an attribute storage buffer, in accordance with one embodiment. At step 405, a shader program is compiled by a compiler. At step 410, the compiler determines if all input attribute read operations occur before any output attribute write operations, and, if so, at step 415, attribute buffer combining is enabled. However, if, at step 410, the compiler determines that all input attribute read operations do not occur before one or more output attribute write operations, then, at step 420, attribute buffer combining is disabled. In one embodiment, an attribute storage optimization flag in a header of the shader program is set to enable and disable combining of the storage for the input attributes and the output attributes.

After the shader program has been compiled, the shader program may be combined with other shader programs and executed by the same processor that was used to compile the shader program or by a different processor. The shader program and other shader programs may be configured to form a processing pipeline with one or more fixed-function hardware engines that reside within the processor that executes the shader program. At step 430, a processing unit that is configured to execute the shader program determines if attribute buffer combining is enabled for the shader program. Buffer combining may be enabled or disabled for each fixed-function hardware engine based on the configuration of the fixed-function hardware engine. Although the following steps are described in terms of shader programs, the steps apply equally to fixed-function hardware engines.

If the processing unit determines that attribute buffer combining is not enabled, then, at step 465, separate attribute storage buffers are allocated for the input attributes read by the shader program and the output attributes that are generated by the shader program. Pointers (i.e., base addresses) to the separate attributes storage buffers are provided to the shader program.

However, if, at step 430, the processing unit determines that attribute buffer combining is enabled, then, at step 435, the processing unit determines if the input attributes are generated by a previous shader program. In other words, the processing unit determines if a portion of output attributes generated by a previous shader program are the input attributes, and, if so, at step 440, the processing unit obtains the size of the attribute buffer that stores the input attributes. The size of the attribute buffer will be at least the size needed to store the input attributes that are read by the shader program and it may be larger if the input attributes that are read for one or more previous shader programs require more storage space. For example, if attribute buffer sharing is enabled for each of the shader programs and the fixed-function hardware engine 350 shown in FIG. 3, the input attributes that are read by each of the shader programs 230 and 240 and fixed-function hardware engine 350 may be stored in the attribute buffer 315 and the attribute buffer 310 is not allocated.

If, at step 435, the processing unit determines that the input attributes are not generated by a previous shader program, in other words, the shader program is the first shader program in the processing pipeline, then, at step 445, the processing unit identifies the input attributes that are read by the shader program. The processing unit determines the size of the attribute buffer that is needed to store the input attributes. At step 450, the processing unit identifies the portion of output attributes consumed by a destination shader program and determines the size of the attribute buffer that is needed to store the portion of the output attributes. When there is no destination shader program, i.e., the shader program is the last shader program in the processing pipeline, the portion of the output attributes generated by the shader program are used to determine the size of the attribute buffer that is needed to store the output attributes.

At step 455, the size of the attribute storage buffer that is allocated for execution of the shader program is computed based on the input attributes and the portion of the output attributes (or the output attributes when there is no destination shader program). In one embodiment, the size of the attribute storage buffer is computed as the maximum of the size of the attribute buffer that stores the input attributes and the size of the attribute buffer that is needed to store the portion of the output attributes (or the output attributes when there is no destination shader program).

At step 460, a single attribute storage buffer is allocated for the input attributes read by the shader program and the output attributes that are generated by the shader program. A pointer (i.e., base address) to the attribute storage buffer is provided to the shader program. The single base address is used to read the input attributes and write the output attributes. When multiple shader programs and/or fixed-function hardware engines are combined, as shown in FIG. 3, the single attribute storage buffer may be allocated as the attribute storage buffer for two or more shader programs and/or fixed-function hardware engines. When attribute buffer combining is enabled for all of the shader programs and/or fixed-function hardware engines, a single attribute storage buffer that is sized to store the maximum of the amount of storage for the different input attributes and the amount of storage for the output attributes generated by the last shader program or fixed-function hardware engine may be allocated to all of the shader programs and fixed-function hardware engines.

Figure 5:
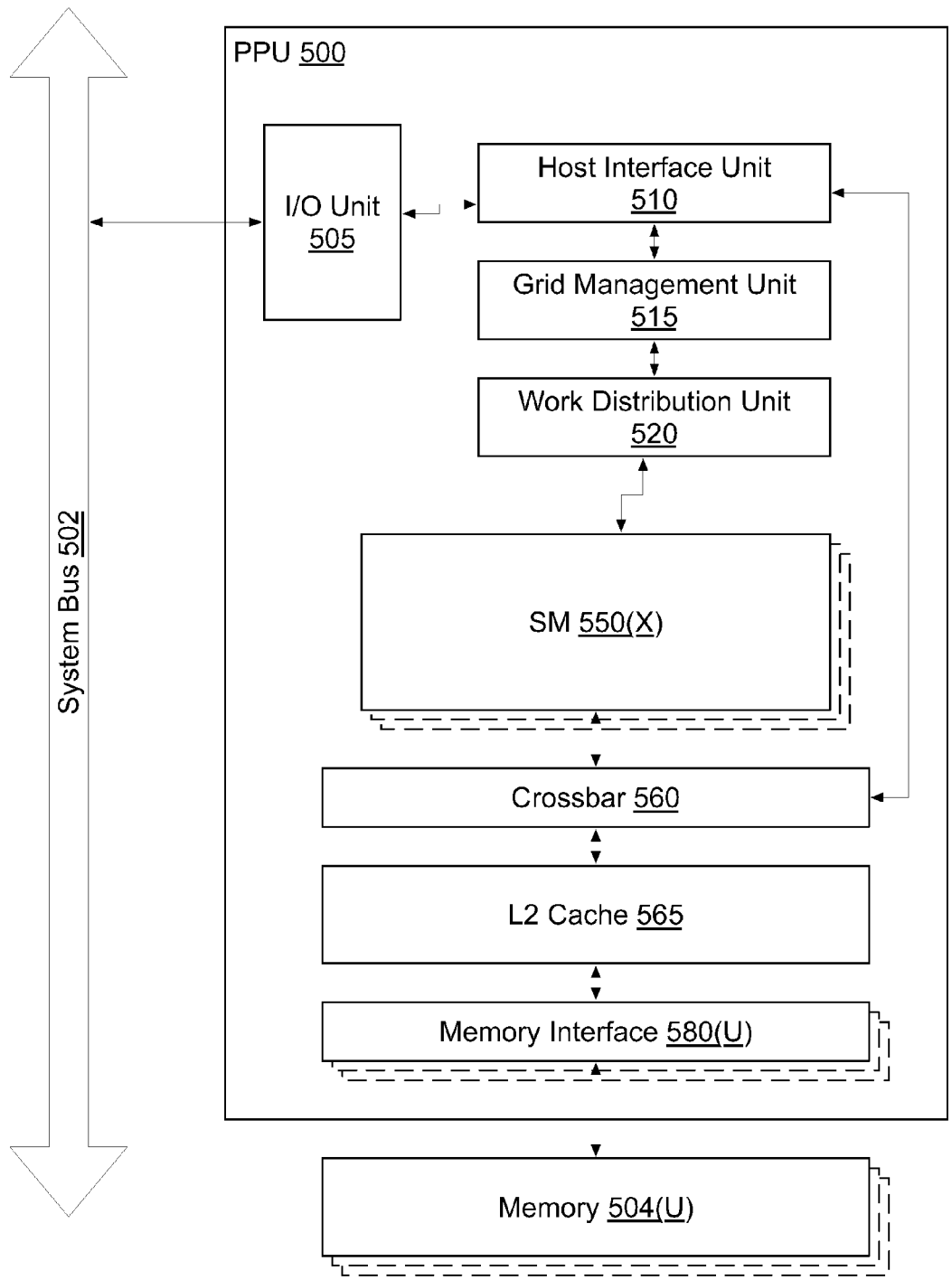
FIG. 5 illustrates a parallel processing unit (PPU), according to one embodiment.

FIG. 5 illustrates a parallel processing unit (PPU) 500, according to one embodiment. While a parallel processor is provided herein as an example of the PPU 500, it should be strongly noted that such processor is set forth for illustrative purposes only, and any processor may be employed to supplement and/or substitute for the same. In one embodiment, the PPU 500 is configured to execute a plurality of threads concurrently in two or more streaming multi-processors (SMs) 550. A thread (i.e., a thread of execution) is an instantiation of a set of instructions executing within a particular SM 550. Each SM 550, described below in more detail in conjunction with FIG. 6, may include, but is not limited to, one or more processing cores, one or more load/store units (LSUs), a level-one (L1) cache, shared memory, and the like.

In one embodiment, the PHI 500 includes an input/output (I/O) unit 505 configured to transmit and receive communications (i.e., commands, data, etc.) from a central processing unit (CPU) (not shown) over the system bus 502. The I/O unit 505 may implement a Peripheral Component Interconnect Express (PCIe) interface for communications over a PCIe bus. In alternative embodiments, the I/O unit 505 may implement other types of well-known bus interfaces.

The PPU 500 also includes a host interface unit 510 that decodes the commands and transmits the commands to the grid management unit 515 or other units of the PPU 500 (e.g., memory interface 580) as the commands may specify. The host interface unit 510 is configured to route communications between and among the various logical units of the PPU 500.

In one embodiment, a program encoded as a command stream is written to a buffer by the CPU. The buffer is a region in memory, e.g., memory 504 or system memory, that is accessible (i.e., read/write) by both the CPU and the PPU 500. The CPU writes the command stream to the buffer and then transmits a pointer to the start of the command stream to the PPU 500. The host interface unit 510 provides the grid management unit (GMU) 515 with pointers to one or more streams. The GMU 515 selects one or more streams and is configured to organize the selected streams as a pool of pending grids. The pool of pending grids may include new grids that have not yet been selected for execution and grids that have been partially executed and have been suspended.

A work distribution unit 520 that is coupled between the GMU 515 and the SMs 550 manages a pool of active grids, selecting and dispatching active grids for execution by the SMs 550. Pending grids are transferred to the active grid pool by the GMU 515 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 520. In addition to receiving grids from the host interface unit 510 and the work distribution unit 520, the GMU 510 also receives grids that are dynamically generated by the SMs 550 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 500. An application may include instructions (i.e., API calls) that cause the driver kernel to generate one or more grids for execution. In one embodiment, the PPU 500 implements a SIMD (Single-Instruction, Multiple-Data) architecture where each thread block (i.e., warp) in a grid is concurrently executed on a different data set by different threads in the thread block. The driver kernel defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may. exchange data through global memory.

In one embodiment, the PPU 500 comprises X SMs 550 (X). For example, the PPU 100 may include 15 distinct SMs 550. Each SM 550 is multi-threaded and configured to execute a plurality of threads (e.g., 32 threads) from a particular thread block concurrently. Each of the SMs 550 is connected to a level-two (L2) cache 565 via a crossbar 560 (or other type of interconnect network). The L2 cache 565 is connected to one or more memory interfaces 580. Memory interfaces 580 implement 16, 32, 64, 128-bit data buses, or the like, for high-speed data transfer. In one embodiment, the PPU 500 comprises U memory interfaces 580(U), where each memory interface 580(U) is connected to a corresponding memory device 504(U). For example, PPU 500 may be connected to up to 6 memory devices 504, such as graphics double-data-rate, version 5, synchronous dynamic random access memory (GDDR5 SDRAM), In one embodiment, the PPU 500 implements a multi-level memory hierarchy. The memory 504 is located off-chip in SDRAM coupled to the PPU 500. Data from the memory 504 may be fetched and stored in the L2 cache 565, which is located on-chip and is shared between the various SMs 550. In one embodiment, each of the SMs 550 also implements an L1 cache. The L1 cache is private memory that is dedicated to a particular SM 550. Each of the L1 caches is coupled to the shared L2 cache 565. Data from the L2 cache 565 may be fetched and stored in each of the L1 caches for processing in the functional units of the SMs 550.

In one embodiment, the PPU 500 comprises a graphics processing unit (GPU). The PPU 500 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 500 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shader, etc.

For example, the GMU 515 may configure one or more SMs 550 to execute a vertex shader program that processes a number of vertices defined by the model data. In one embodiment, the GMU 515 may configure different SMs 550 to execute different shader programs concurrently. For example, a first subset of SMs 550 may be configured to execute a vertex shader program while a second subset of SMs 550 may be configured to execute a pixel shader program. The first subset of SMs 550 processes vertex data to produce processed vertex data and writes the processed vertex data to the L2 cache 565 and/or the memory 504. After the processed vertex data is rasterized (i.e., transformed from three-dimensional data into two-dimensional data in screen space) to produce fragment data, the second subset of SMs 550 executes a pixel shader to produce processed fragment data, which is then blended with other processed fragment data and written to the frame buffer in memory 504. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

When attribute buffer combining is not enabled for a shader program, the input attributes, e.g., vertex data, processed vertex data, fragment data, etc., and the output attributes corresponding to the shader program are stored in separate attribute buffers in the shared memory (i.e., L1 cache and/or the memory 504), When attribute buffer combining is enabled for one or more shader programs, one or more combined attribute buffers are allocated for the one of more shader programs. In one embodiment, a particular attribute buffer may be accessed by threads in the same thread group or warp. When space is not available for allocation of an additional attribute buffer, the processing performance of the PPU 500 may be limited even though one or more SMs 550 may be idle. Therefore, reducing the amount of space needed for storing attribute buffers may improve processing performance of the PPU 500.

The PPU 500 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 500 is embodied on a single semiconductor substrate. In another embodiment, the PPU 500 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 500 may be included on a graphics card that includes one or more memory devices 504 such as GDDR5 SDRAM. The graphics card may be configured to interface with a PCIe slot on a motherboard of a desktop computer that includes, e.g., a northbridge chipset and a southbridge chipset. In yet another embodiment, the PPU 500 may be an integrated graphics processing unit (iGPU) included in the chipset (i.e., Northbridge) of the motherboard.

Figure 6:
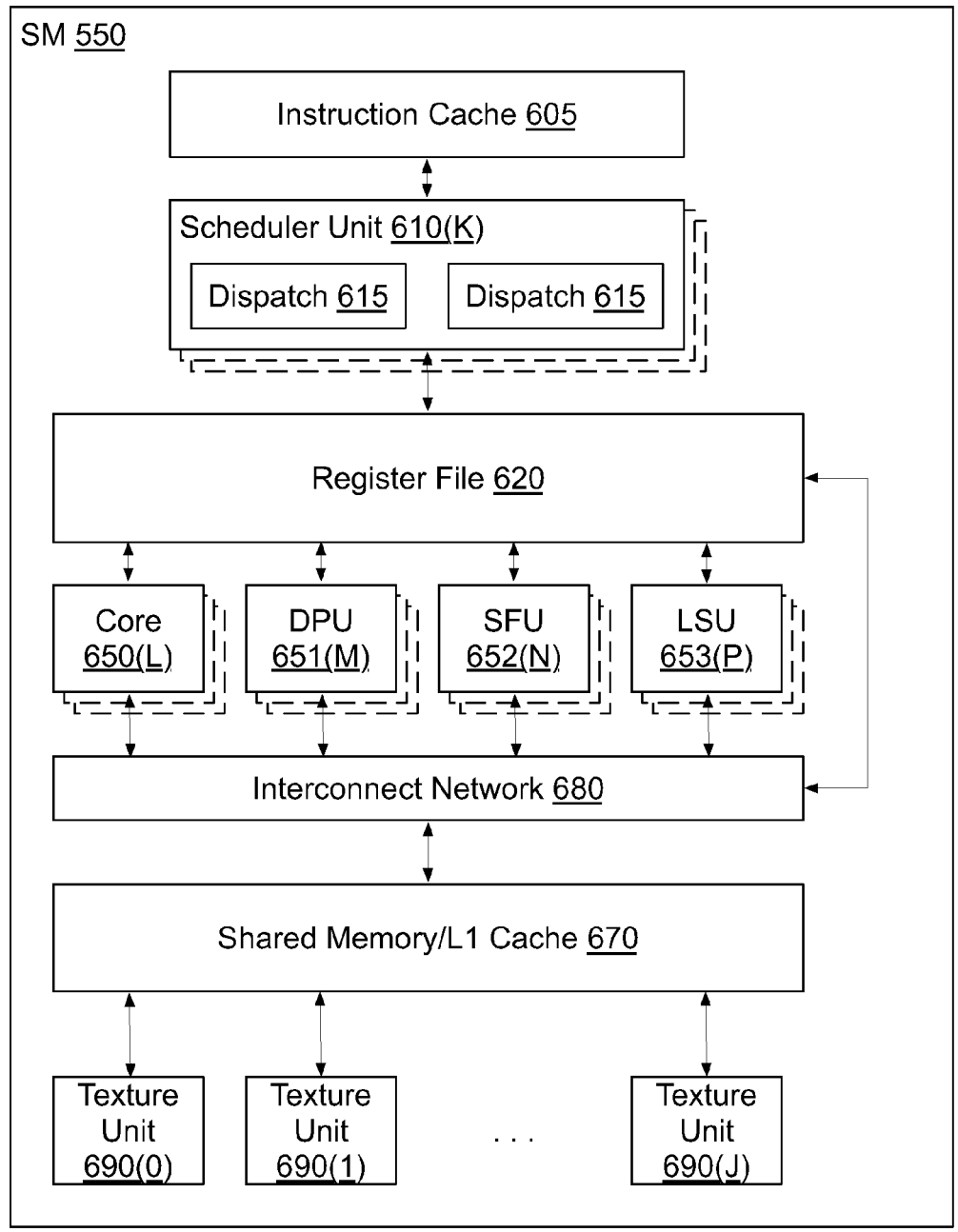
FIG. 6 illustrates the streaming multi-processor of FIG. 5, according to one embodiment.

FIG. 6 illustrates the streaming multi-processor 550 of FIG. 5, according to one embodiment. As shown in FIG. 6, the SM 550 includes an instruction cache 605, one or more scheduler units 610, a register file 620, one or more processing cores 650, one or more double precision units (DPUs) 651, one or more special function units (SFUs) 652, one or more load/store units (LSUs) 653, an interconnect network 680, a shared memory/L1 cache 670, and one or more texture units 690.

As described above, the work distribution unit 520 dispatches active grids for execution on one or more SMs 550 of the PPU 500. The scheduler unit 610 receives the grids from the work distribution unit 520 and manages instruction scheduling for one or more thread blocks of each active grid. The scheduler unit 610 schedules threads for execution in groups of parallel threads, where each group is called a warp. In one embodiment, each warp includes 32 threads. The scheduler unit 610 may manage a plurality of different thread blocks, allocating the thread blocks to warps for execution and then scheduling instructions from the plurality of different warps on the various functional units i.e., cores 650, DPUs 651, SFUs 652, and LSUs 653) during each clock cycle.

In one embodiment, each scheduler unit 610 includes one or more instruction dispatch units 615. Each dispatch unit 615 is configured to transmit instructions to one or more of the functional units. In the embodiment shown in FIG. 6, the scheduler unit 610 includes two dispatch units 615 that enable two different instructions from the same warp to be dispatched during each clock cycle. In alternative embodiments, each scheduler unit 610 may include a single dispatch unit 615 or additional dispatch units 615.

Each SM 650 includes a register file 620 that provides a set of registers for the functional units of the SM 650. In one embodiment, the register file 620 is divided between each of the functional units such that each functional unit is allocated a dedicated portion of the register file 620. In another embodiment, the register file 620 is divided between the different warps being executed by the SM 550. The register file 620 provides temporary storage for operands connected to the data paths of the functional units.

Each SM 550 comprises L processing cores 650. In one embodiment, the SM 550 includes a large number (e.g., 192, etc.) of distinct processing cores 650. Each core 650 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 550 also comprises M DPUs 651 that implement double-precision floating point arithmetic, N S Ells 652 that perform special functions (e.g., copy rectangle, pixel blending operations, and the like), and P LSUs 653 that implement load and store operations between the shared memory/L1 cache 670 and the register file 620. In one embodiment, the SM 550 includes 64 DPUs 651, 32 SFUs 652, and 32 LSUs 653.

Each SM 550 includes an interconnect network 680 that connects each of the functional units to the register file 620 and the shared memory/L1 cache 670. In one embodiment, the interconnect network 680 is a crossbar that can be configured to connect any of the functional units to any of the registers in the register file 620 or the memory locations in shared memory/L1 cache 670.

In one embodiment, the SM 550 is implemented within a GPU. In such an embodiment, the SM 550 comprises texture units 690. The texture units 690 are configured to load texture maps (i.e., a 2D array of texels) from the memory 504 and sample the texture maps to produce sampled texture values for use in shader programs. The texture units 690 implement texture operations such as anti-aliasing operations using mipmaps (i.e., texture maps of varying levels of detail). In one embodiment, the SM 550 includes 16 texture units 690.

The PPU 500 described above may be configured to perform highly parallel computations much faster than conventional CPUs. Parallel computing has advantages in graphics processing, data compression, biometrics, stream processing algorithms, and the like.

Figure 7:
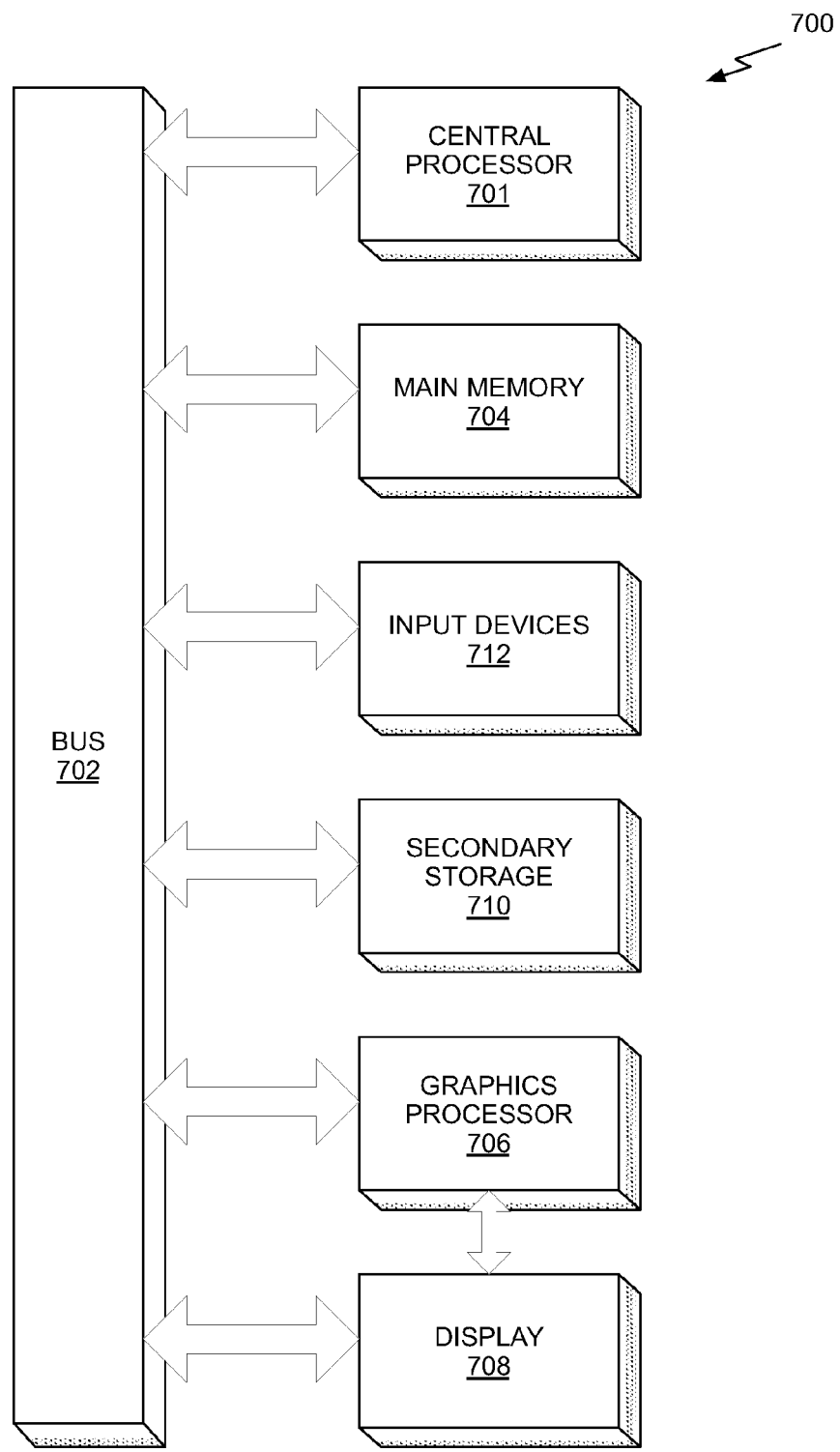
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. As shown, a system 700 is provided including at least one central processor 701 that is connected to a communication bus 702. The communication bus 702 may be implemented using any suitable protocol, such as PCI (Peripheral Component Interconnect), PCI-Express, AGP (Accelerated Graphics Port), HyperTransport, or any other bus or point-to-point communication protocol(s). The system 700 also includes a main memory 704.

Control logic (software) and data are stored in the main memory 704 which may take the form of random access memory (RAM).

The system 700 also includes input devices 712, a graphics processor 706, and a display 708, i.e. a conventional CRT (cathode ray tube), LCD (liquid crystal display), LED (light emitting diode), plasma display or the like. User input may be received from the input devices 712, e.g., keyboard, mouse, touchpad, microphone, and the like. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 704 and/or the secondary storage 710. Such computer programs, when executed, enable the system 700 to perform various functions. For example, a compiler program that is configured to examiner a shader program and enable or disable attribute buffer combining may be stored in the main memory 704. The compiler program may be executed by the central processor 701 or the graphics processor 706. The main memory 704, the storage 710, and/or any other storage are possible examples of computer-readable media.

In one embodiment, the architecture and/or functionality of the various previous figures may be implemented in the context of the central processor 701, the graphics processor 706, an integrated circuit (not shown) that is capable of at least a portion of the capabilities of both the central processor 701 and the graphics processor 706, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, laptop computer, server, workstation, game consoles, embedded system, and/or any other type of logic. Still yet, the system 700 may take the form of various other devices including, but not limited to a personal digital assistant (PDA) device, a mobile phone device, a television, etc.

Further, while not shown, the system 700 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
   identifying input attributes read by a shader program to generate output attributes;
   identifying a portion of the output attributes to be consumed by a destination shader program or a fixed-function hardware engine;
   computing a size of an attribute storage buffer to be allocated for execution of the shader program based on the input attributes and the portion of the output attributes; and
   enabling attribute buffer combining for the shader program when all reads of the e input attributes occur before any writes of the output attributes.

2. The method of claim 1, further comprising providing a single base address corresponding to the attribute storage buffer to the shader program for reading the input attributes and writing the output attributes.

3. The method of claim 1, wherein the identifying of the portion of the output attributes to be consumed by the destination shader program or the fixed-function hardware engine comprises combining a first mask indicating the output attributes generated by the shader program with a second mask indicating the input attributes that are consumed by the destination shader program or the fixed-function hardware engine.

4. The method of claim 1, wherein the computing of the size of the attribute storage buffer to be allocated comprises selecting a maximum of a first amount of storage needed for the input attributes read by the shader program and a second amount of storage needed for the portion of the output attributes to be consumed by the destination shader program or the fixed-function hardware engine.

5. The method of claim 1, wherein the computing of the size of the attribute storage buffer to be allocated comprises selecting a maximum of a first amount of storage needed for the input attributes read by the shader program, a second amount of storage needed for the portion of the output attributes to be consumed by the destination shader program or the fixed-function hardware engine, and a third amount of storage needed for output attributes generated by the destination shader program and consumed as input attributes by either an additional shader program or an additional fixed-function hardware engine.

6. The method of claim 1, wherein the shader program is a pixel shader program and the input attributes are fragment data.

7. The method of claim 1, wherein the shader program is a vertex shader program and the input attributes are vertex data.

8. The method of claim 1, wherein an additional input attribute that is set to a default value is consumed by the shader program or the fixed-function hardware engine to generate the output attributes.

9. The method of claim 1, wherein the shader program is a geometry shader program and the input attributes are geometry data.

10. A method comprising;
    identifying input attributes read by a shader program to generate output attributes;

identifying a portion of the output attributes that are input attributes for the destination shader program or a fixed-function hardware engine;

computing a size of an attribute storage buffer to be allocated for execution of the shader program based on the input attributes and the portion of the output attributes; and disabling attribute buffer combining for the destination shader program when at least one write of an output attribute generated by the destination shader program occurs before at least one read of an input attribute for die destination shader program.

11. The method of claim 10, wherein the shader program is a pixel shader program and the input attributes are fragment data.

12. The method of claim 10, wherein the shader program is a vertex shader program and the input attributes are vertex data.

13. The method of claim 10, wherein the shader program is a geometry shader program and the input attributes are geometry data.

14. A non-transitory computer-readable storage medium storing instructions that, when executed by a processor, cause the processor to perform steps comprising:

identifying input attributes read by a shader program to generate output attributes;

identifying a portion of the output attributes to be consumed by a destination. shader program or a fixed-function hardware engine;

computing a size of an attribute storage buffer to be allocated for execution of the shader program based on the input attributes and the portion of the output attributes; and enabling attribute buffer combining for the shader program when all reads of the attributes occur before an writes of the output attributes.

15. The non-transitory computer-readable storage medium of claim 14, wherein the identifying of the portion of the output attributes to be consumed by the destination shader program or the fixed-function hardware engine comprises combining a first mask indicating the output attributes generated by the shader program with a second. mask indicating the input attributes of the destination shader program or the fixed-function hardware engine.

16. The non-transitory computer-readable storage medium of claim 14, wherein the computing of the size of the attribute storage buffer to be allocated comprises selecting a maximum of a first amount of storage needed for the input attributes consumed by the shader program and a second amount of storage needed for the portion of the output attributes to be consumed by the destination shader program or the fixed-function hardware engine.

17. The non-transitory computer-readable storage medium of claim 14, wherein the shader program is a vertex shader program and the input attributes are vertex data.

18. A system comprising:

a memory storing a shader program and a destination shader program; and one or more processing units coupled to the memory and configured to:

identify input attributes read by the shader program to generate output attributes;

identify a portion of the output attributes to be consumed by the destination shader program;

compute a size of an attribute storage buffer to be allocated for execution of the shader program based on the input attributes and the portion of the output attributes; and enable attribute buffer combining for the shader program when all reads of the input attributes occur before any writes of the output attributes.

19. The system of claim 18, wherein the one or more processing units reside within a graphics processing unit.

20. The system of claim 18, further comprising a cache, and wherein the one or more processing units are further configured to allocate the attribute storage buffer within the cache.

* * * * *